United States Patent
Gui et al.

(10) Patent No.: US 11,734,501 B1
(45) Date of Patent: Aug. 22, 2023

(54) ELECTRONIC DOCUMENT MANAGEMENT SYSTEM WITH A CONTENT STATUS DESIGNATION INTERFACE

(71) Applicants: Atlassian Pty Ltd., Sydney (AU); Atlassian Inc., San Francisco, CA (US)

(72) Inventors: Erik Gui, San Bernadino, CA (US); Samantha Ugulava, San Francisco, CA (US); Lulu Wang, San Francisco, CA (US); Eric Van Lare, San Jose, CA (US); Mark Séjourné, New York, NY (US); Traci Wilbanks, San Francisco, CA (US)

(73) Assignees: ATLASSIAN PTY LTD., Sydney (AU); ATLASSIAN US, INC., San Francisco, CA (US)

( * ) Notice: Subject to any disclaimer, the term of this patent is extended or adjusted under 35 U.S.C. 154(b) by 0 days.

(21) Appl. No.: 17/853,574

(22) Filed: Jun. 29, 2022

Related U.S. Application Data

(60) Provisional application No. 63/344,624, filed on May 22, 2022.

(51) Int. Cl.
| | |
|---|---|
| *G06F 40/166* | (2020.01) |
| *G06F 3/0482* | (2013.01) |
| *G06F 3/04845* | (2022.01) |
| *G06F 3/04847* | (2022.01) |
| *G06F 16/958* | (2019.01) |
| *G06F 40/106* | (2020.01) |

(52) U.S. Cl.
CPC .......... *G06F 40/166* (2020.01); *G06F 3/0482* (2013.01); *G06F 3/04845* (2013.01); *G06F 3/04847* (2013.01); *G06F 16/986* (2019.01); *G06F 40/106* (2020.01)

(58) Field of Classification Search
CPC .. G06F 40/166; G06F 3/0482; G06F 3/04845; G06F 3/04847; G06F 16/986; G06F 40/106
See application file for complete search history.

(56) References Cited

U.S. PATENT DOCUMENTS

| | | | |
|---|---|---|---|
| 11,416,673 B1* | 8/2022 | Peterson | G06F 3/0483 |
| 2014/0201672 A1* | 7/2014 | Borzello | G06F 3/0482 |
| | | | 715/779 |
| 2017/0168765 A1* | 6/2017 | Fan | H04N 1/00411 |
| 2018/0181269 A1* | 6/2018 | Perez | H04L 63/0807 |
| 2019/0108239 A1* | 4/2019 | Yang | H04L 51/046 |
| 2020/0210383 A1* | 7/2020 | Demaris | G06F 16/168 |
| 2020/0364294 A1* | 11/2020 | Brown | G06F 40/30 |

* cited by examiner

*Primary Examiner* — John T Repsher, III
(74) *Attorney, Agent, or Firm* — Brownstein Hyatt Farber Schreck, LLP

(57) ABSTRACT

The disclosure is directed to system that is configured to manage electronic content and, more specifically, provide a user interface for designating content status with respect to electronic content. The electronic content may be managed by a content collaboration system that manages and stores user-generated content in a series of related pages or documents. Content status may be designated using controls provided via a web-browser user interface and used for tracking and management of electronic content by individual users, which may allow for improved data preservation and more uniform content management.

17 Claims, 10 Drawing Sheets

ELECTRONIC DOCUMENT MANAGEMENT SYSTEM WITH A CONTENT STATUS DESIGNATION INTERFACE

CROSS-REFERENCE TO RELATED APPLICATION(S)

This application is a nonprovisional patent application of and claims the benefit of U.S. Provisional Patent Application No. 63/344,624, filed May 22, 2022 and titled "Electronic Document Management System with a Content Status Designation Interface," the disclosure of which is hereby incorporated herein by reference in its entirety.

FIELD

The described embodiments relate generally to an interface for managing electronic documents and pages. More particularly, the present embodiments relate to an interface for providing a content status from within the document management interface.

BACKGROUND

Modern enterprises and collaboration platforms typically manage large volumes of electronic documents and other electronic content created by users of the platform. A collaboration platform may also allow for live or dynamic editing of electronic content, which may be viewed by a designated group of users. In many traditional systems, it can be difficult to track and manage various versions of the content as it created or modified by various users. Additionally, users may hesitate to publish works-in-progress as the newly created content might be easily confused with completed or static content. As a result, users may create and edit content in separate systems, which may not include satisfactory data backup or data privacy controls, resulting in an overall content management solution that is non-compliant with data management practices. The systems and techniques described herein may be used to improve the tracking and management of electronic content by individual users within a single system, which may allow for improved data preservation and more uniform data privacy controls. The proposed system may also provide improved flexibility and utilization for content creators and other system users.

SUMMARY

The embodiments and examples described herein are directed to computer systems and computer-implemented methods for operating a computer-generated interface for editing and viewing electronic content. As described herein, the system may include a backend configured to provide page content or other electronic content of a content collaboration platform over a computer network to a plurality of client devices. Each client device may be operating a web browser client application. At the web browser client application and in response to a request to edit a page at a client device, the system may cause display of a page-edit user interface within the web browser client application. The page-edit user interface may include page content generated in response to user input provided to the client device. The page content may be stored by the backend application as a page object. At the web browser client application and in response to a hover input over a designated region, the system may cause display of a content status option within the page-edit user interface. The designated region may be substantially free of page content. In response to a user selection of the content status option, the system may cause display of a list of selectable content status items. In response to a user selection of a particular selectable content status item of the list of selectable content status items, the page object may be modified in accordance with the user selection of the particular selectable content status item. In response to a request to view the page at the client device of the plurality of client devices, the system may cause display of a page-view user interface within the web browser client application. The page-view user interface may include a page content region including the page content and a selectable control region including an array of selectable controls including a content status control displaying a status indicia corresponding to the particular selectable content status item.

BRIEF DESCRIPTION OF THE DRAWINGS

Reference will now be made to representative embodiments illustrated in the accompanying figures. It should be understood that the following descriptions are not intended to limit this disclosure to one included embodiment. To the contrary, the disclosure provided herein is intended to cover alternatives, modifications, and equivalents as may be included within the spirit and scope of the described embodiments, and as defined by the appended claims.

The use of the same or similar reference numerals in different figures indicates similar, related, or identical items.

Figure 1:
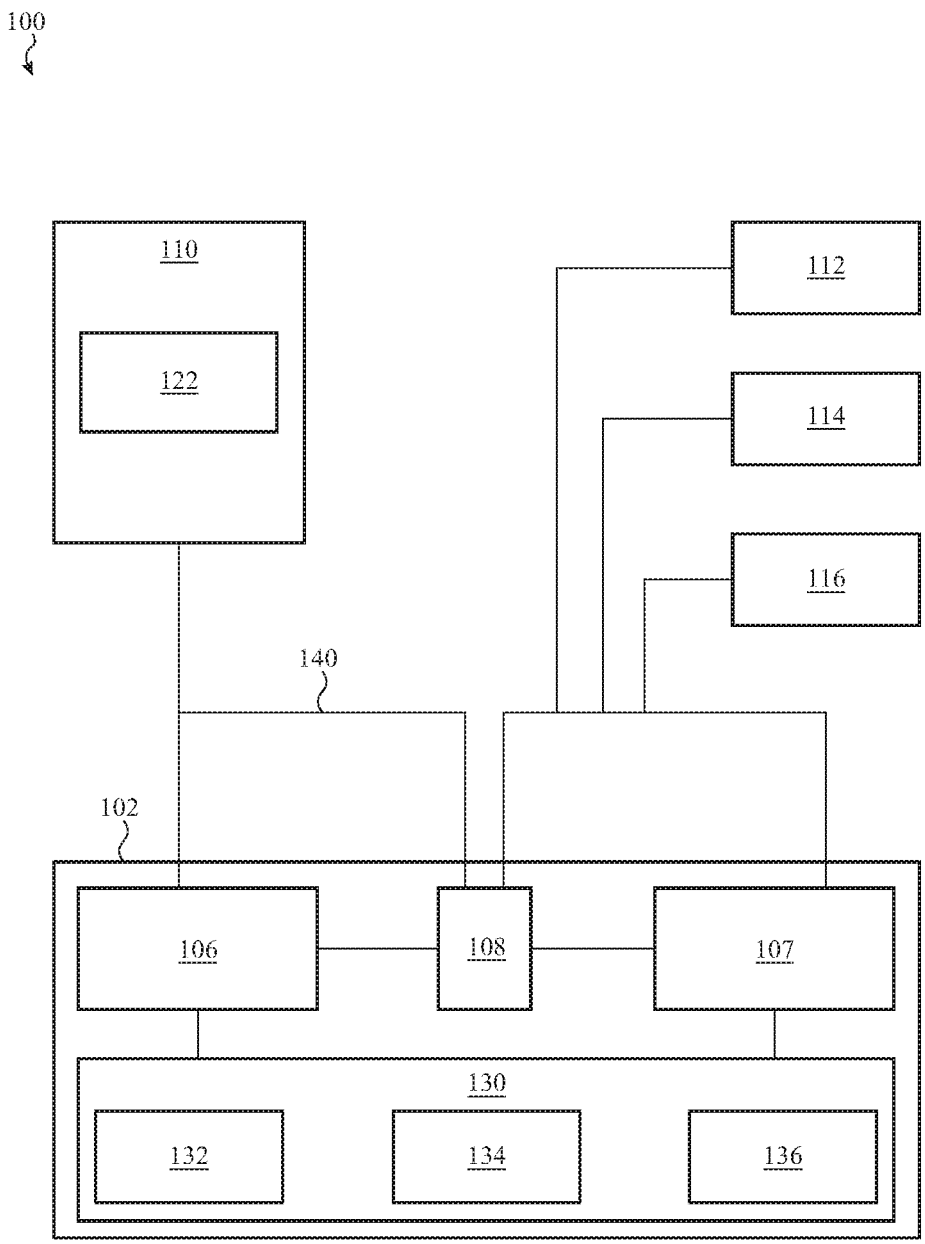
FIG. 1 depicts a system for providing content to client devices in accordance with the embodiments described herein.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

The systems and techniques described herein are directed to a content collaboration platform or other type electronic content management system that allows users to create and publish electronic content using a client application. In particular, the systems and techniques described herein may be applicable to content collaboration platforms that use a web browser client application to generate content creation and editing interfaces for creating electronic content and also content viewing interfaces for viewing the electronic content. The systems and techniques described herein are directed to a content status designation interface that allows each content creator to create and control a status of a particular page, document, or other electronic content.

In some systems, tracking and management of electronic content may be difficult due to the fact that electronic content may be in various states or stages of completion. Viewing published content, it may be difficult to determine whether the content is in a final form, is under review, or is otherwise incomplete or unfinalized. Additionally, as mentioned previously, users may hesitate to publish works-in-progress or early drafts as the newly created content may be confused with completed or static content. As a result, users may create and edit content in separate systems, which may not include satisfactory data backup or data privacy controls, resulting in an overall content management solution that is non-compliant with data management practices. The systems and techniques described herein may be used to improve the tracking and management of electronic content by individual users within a single system, which may allow for improved data preservation and more uniform data privacy controls. The proposed system may also provide improved flexibility and utilization for content creators and other system users.

As described herein, the system may be operated through a client application, which may be a dedicated client application for a web-enabled application like a web browser. Using the same client application, the user interface may be operated in an edit user interface (e.g., a page-edit user interface or document-edit user interface), a view user interface (e.g., a page-view user interface or document-view user interface), or another user interface or operational mode. The client application may allow the user to create, modify, and view a content status depending on the operational mode of the client application. In particular, the client application may provide a graphical interface for allowing the use to classify content using a list of selectable content status items while the page content is being displayed in accordance with an edit user interface or mode. The client application may also provide a content status control having a status indicia corresponding to a content status while the page content is being displayed in accordance with a view interface or mode.

In some embodiments described herein, the controls for allowing the creation or modification of content status may be hidden until a particular input is provided to the edit user interface. For example, display of the content status controls may be suppressed or hidden until a hover input or other specified input is provided to the interface. As described herein, a hover input may include a user direction of cursor element or other selection control within a particular designated region within the edit user interface. If the cursor element or other selection control is positioned within the designated region for a threshold amount of time, the content status controls may be unsuppressed or revealed. Through the use of the content status controls, the user may select from a list of predefined content status items or a user-defined content status item. Each item may correspond to a particular state or classification of the content and may also be associated with a predefined color of a status color palette.

Once associated with the page or document content, the content status may be used in conjunction with a content status control within an array of selectable controls displayed in accordance with a view interface or mode. The content status control may be selectable in order to cause display of page details, status, edit history, and other data obtained from user event logs or interactions with the electronic content. In some cases, the content status control is selectable to display document or page metadata, which may include one or more of the aforementioned items. The content status may also be used to operationalize automations with respect to system content including bulk actions, scripted operations, automated content modifications, or other programmatic operations performed with respect to content managed by the system. The content status may also be used to establish or discover relationships between content and may be the subject of electronic content analytics, tracking, or other analysis of content managed by the system.

These foregoing and other embodiments are discussed below with reference to FIGS. 1, 2A-2C, 3A-3B, 4A-4C, 5, and 6. However, those skilled in the art will readily appreciate that the detailed description given herein with respect to these figures is for explanation only and should not be construed as limiting.

FIG. 1 depicts a simplified diagram of a system, such as described herein. The system 100 is depicted as implemented in a client-server architecture or client-service architecture, but it may be appreciated that this is merely one example and that other communications architectures are possible. In accordance with the examples provide herein, the system 100 of FIG. 1 can be used to provide a series of interfaces to a content collaboration platform or other electronic content management system via a computer network. The architecture of system 100 allows for remote access of electronic content using either a dedicated client application to access backend servers or a web browser client application to access one or more web services offered by a backend system. As described herein, the system 100 may be used to create, manage, and display content status for electronic content.

The networked computer system or system 100 of FIG. 1 depicts an example configuration in which multiple client devices 110, 112, 114, and 116 may access either host server of a set of host servers 102 via a computer network 140. The computer network 140 may include a distributed network which may include local networks, gateways, and networking services provided by one or more internet service providers. The client devices 110, 112, 114, and 116 are able to view and share content via the network 140 either directly or through the various services provided by the set of host servers 102.

The set of host servers 102 may include multiple platform services provided by, for example, first backend 106 and second backend 107. The first backend 106 may for part of a content collaboration platform, which may include a page or document creation and management service, content wiki services, messaging and event feed services, and other collaboration or data management services. The second backend 107 may a second instance of similar services or, alternatively, may provide different services including, for example, issue tracking services for creating, managing, and tracking issues for software development, bug tracking, and/or information technology service management (ITSM) services. The second backend 107 may also provide an interface for a code repository, a deployment management system, or other system or service used to track and manage versioned object storage.

As shown in FIG. 1, the system 100 includes a set of host servers 102 (also referred to as host services) which may be one or more virtual or physical computing resources (collectively referred in many cases as a "cloud platform"). In some cases, the set of host servers 102 can be physically collocated or in other cases, each may be positioned in a geographically unique location.

The set of host servers 102 can be communicably coupled to one or more client devices by a network 140. Multiple example devices are shown as the client device 110, 112, 114, and 116. The client devices 110, 112, 114, and 116 can be implemented as any suitable electronic device. In many embodiments, the client devices 110, 112, 114, and 116 are personal computing devices such as desktop computers, laptop computers, or mobile phones. This is merely one example and is not required of all embodiments. An example hardware configuration of a client device is provided in FIG. 6, described below.

Figure 6:
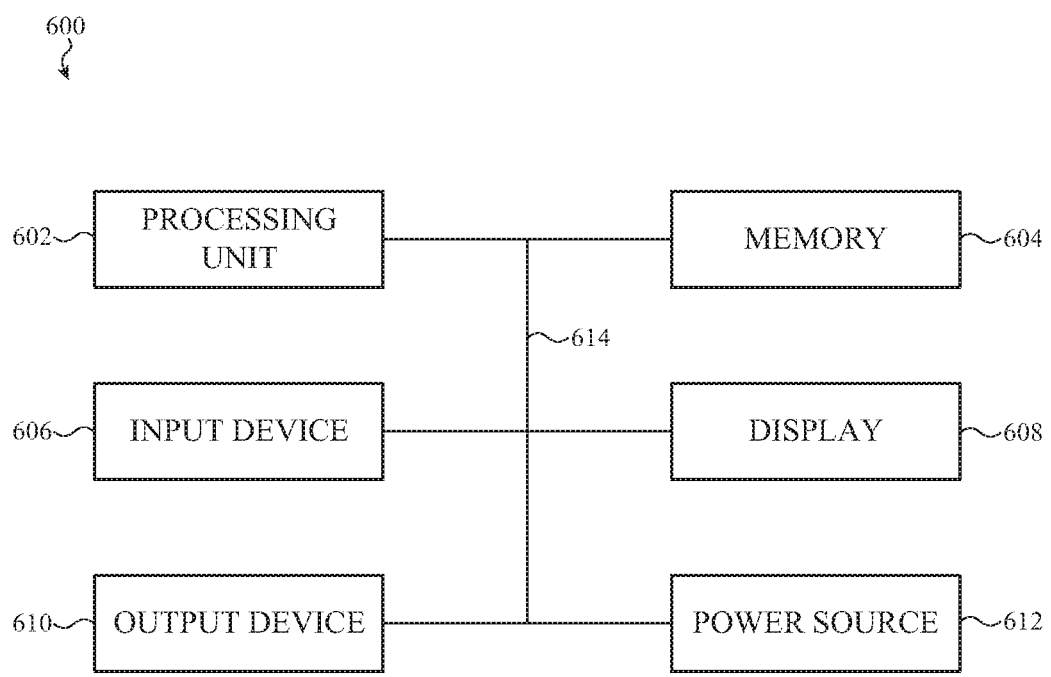
FIG. 6 depicts an example hardware for devices of the systems described herein.

The set of host servers 102 can be supporting infrastructure for one or more backend applications, each of which may be associated with a particular software platform, such as a documentation platform or an issue tracking platform. In particular, a portion of the set of host servers 102 can be allocated as physical infrastructure supporting a first platform backend 106 and a different portion of the set of host servers 102 can be allocated as physical infrastructure supporting a second platform backend 107. FIG. 6, described below, provides an example of various hardware elements that are used by the physical infrastructure supporting one or more of the host servers 102.

As noted with respect to other embodiments described herein, the two or more different platforms may be instantiated over physical resources provided by the set of host servers 102. Once instantiated, the first platform backend 106 and the second platform backend 107 can communicably couple to a shared data store 130 or other data repository. The data store 130 may include a shared multitenant storage system that hosts data from multiple tenants and multiple platforms for use within a specific region or realm. In the current example, the data store 130 includes content storage 132, which may be used to store user-generated content, content space data, content tree data, content metadata and other electronic content associated with the various backend applications 106, 107. The user-generated content may be stored as page objects, document objects, or other data elements. The data store may also include user-profile data stored in user data store 134. The user data store 134 may include a profile for each registered user of one or more of the backend systems 106, 107, user permission settings or profiles, and user history that may include user logs or event histories. The data store 130 may also include system store 136, which may include system settings, administrator profile settings, content space settings, and other system profile data associated with the backend applications 106, 107.

In the current example, the first platform backend 106 can be configured to communicably couple to a first platform frontend 122 instantiated by cooperation of a memory and a processor of the client device 110. Once instantiated, the first platform frontend 122 can be configured to leverage a display of the client device 110 to render a graphical user interface so as to present information to a user of the client device 110 and so as to collect information from a user of the client device 110. As described herein, the first platform frontend 122 may include a web browser client application that can be used to cause display of an edit user interface or mode (e.g., a page-edit user interface or document-edit user interface) a view user interface or mode (e.g., a page-view user interface or document-view user interface), or other content creation, management, and viewing interfaces or modes. In some cases, the first platform frontend 122 is a dedicated client application that is able to provide similar functionality with respect to the content provided by the host servers 102. Client devices 112, 114, and 116 may implement a similar platform frontend, which may be referred to as second, third, or fourth platform frontends.

The first platform frontend 122 can be configured to communicate with the first backend 106 and/or the second backend 107 over a computer network 140, which may include the internet or an established web-based architecture. Information can be transacted by and between the first platform frontend 122, the first backend 106, and the second backend 107 in any suitable manner or form or format. In many embodiments, as noted above, the client device 110 and in particular the first platform frontend 122 can be configured to access either or both of the first backend 106 or the second backend 107 via an authentication service 108, which may authenticate a token or other user credentials transmitted along with a request for access or data provided by the respective backends. The authentication service 108 may be configured to authenticate users in accordance with credentials stored by or registered with the user data store 134.

Figure 2A:
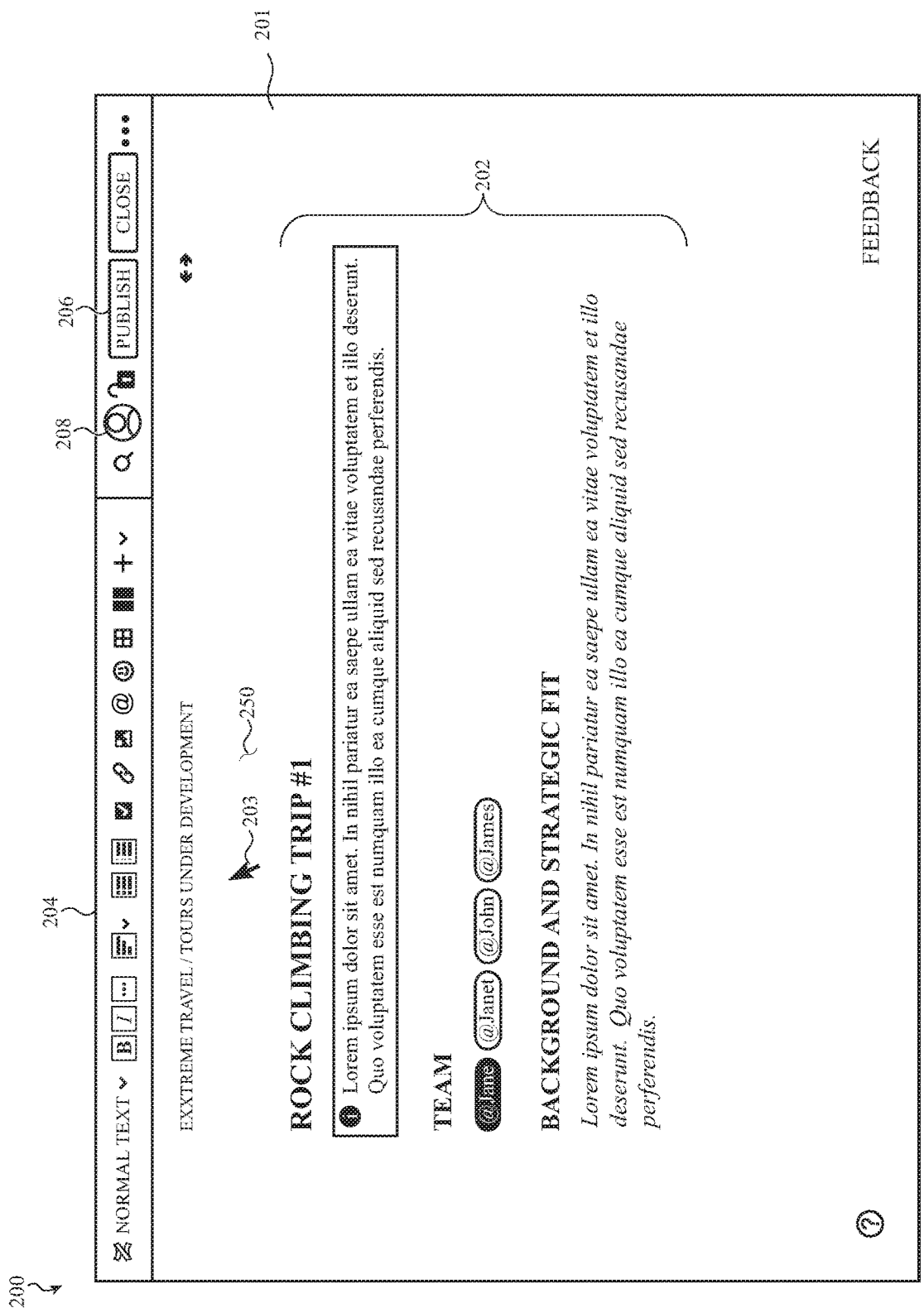
FIGS. 2A-2C depict example views of a page-edit interface of a frontend application.
Figure 2B:
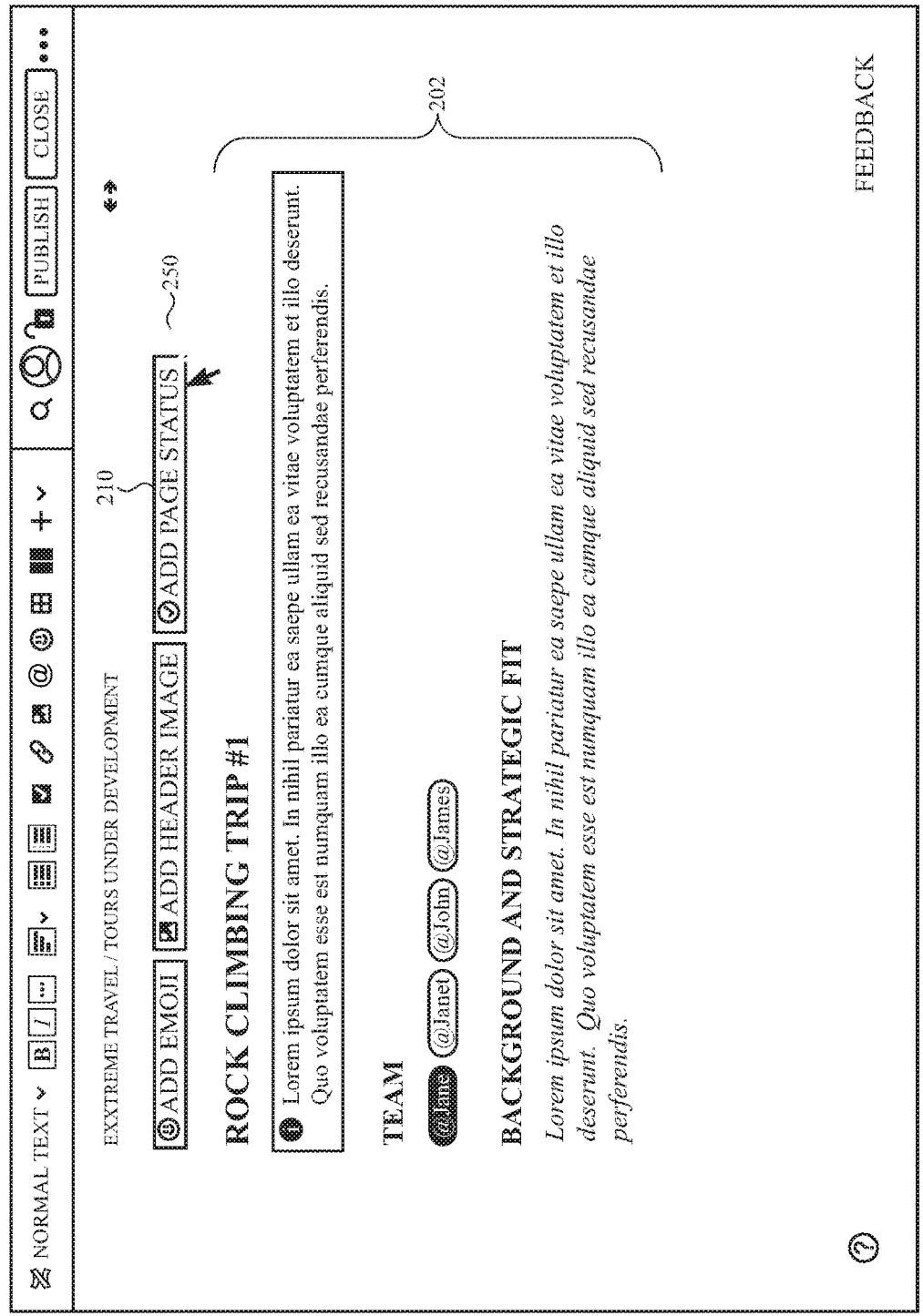
Figure 2C:
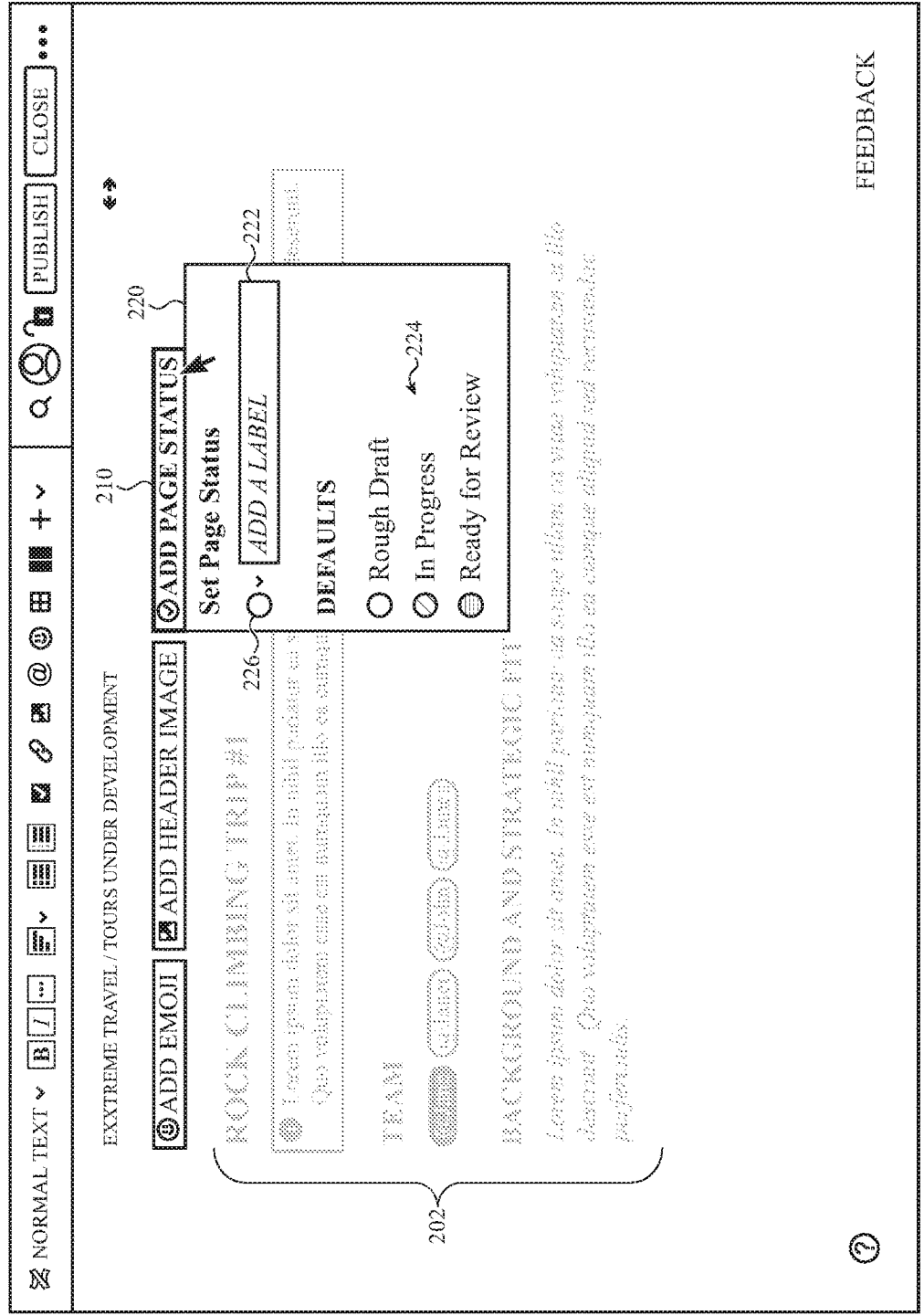

FIGS. 2A-2C depict example views of a page-edit user interface or mode of a frontend application. The page-edit user interface 200 allows a user to create and/or edit content of a page or document. As described herein, the page-edit user interface 200 may be used to generate, edit, or otherwise modify electronic content associated with the user or author. The page-edit user interface 200 may also be referred to as a content-edit user interface, document-edit user interface, edit user interface, or editor. The page-edit user interface 200 may be implemented in a web browser client application using HTML, JavaScript, or other web-enabled protocol. The page-edit user interface 200 may allow the user to create, define, or otherwise modify content status associated with user-generated content. The user-generated content may be referred to herein as page content, document content, electronic content, or simply content.

As shown in the sequence of examples depicted in FIGS. 2A-2C, a page-edit user interface 200 may allow a content creator or content editing user to set or modify a content status associated with the page. The content status can be selected from a subset of predefined content status identifiers that are determined in accordance with an administrator or page-space profile. A content stats can also be selected from a subset user user-defined content status identifiers that are determined in accordance with a user profile or which may be created from within the page-edit user interface 200. As described herein, the content status allows the user to categorize content prior to publication of after publication in order to help signal the state or status of the content to other users. As also described herein, published content may also have access to selectable content status control, which can be used to cause display of transactional information related to the electronic content, metadata of the electronic content, or other data associated with the electronic content. The content status control may also include functionality that can be applied to groups of pages or documents based on the content status including, without limitation, bulk actions, automation scripts, archive and unarchive actions, search operations, content status changes, and other potential operations that may be performed on pages or documents having a particular content status.

As shown in FIG. 2A, the content status options or controls, which may be displayed in designated region 250 may be suppressed or hidden during a normal editing or viewing mode of the page-edit user interface. However, in response to a hover command (e.g., a directing a cursor within the designated region 250 for a predefined or threshold period of time), a content status option or content status controls 210 may be unsuppressed or displayed, as shown in FIGS. 2B and 2C. As a result, the display of the controls for creating or modifying content status may remain hidden from view until they are needed by the user. While a hover command is used in this example, there may be other user inputs that cause the display of the content status options or controls 210. Alternatively, in some cases, the display of the content status option of content status controls 210 is not suppressed or hidden, and thus, appears during normal editing operations of the page or document.

FIG. 2A depicts a page-edit user interface 200 having an example set of controls and user interface elements that facilitate the creation and modification of user-generated content. Specifically, as shown in FIG. 2A, the page-edit user interface 200 may include page content 202 in a page content region, a toolbar panel 204, a publication control 206, and/or a publication status of the page corresponding to a page being displayed on the page-edit user interface 200, and a user profile icon 208 of a user. The various controls and layout of the page-edit user interface 200 may be determined or controlled by one or more settings associated with the content space or a content space administrator.

As shown in FIG. 2A, the page-edit user interface 200 may include a variety of other elements and controls. As shown in FIG. 2A, the page content 202 may include and display information, including but not limited to, a title of the page or document. In some embodiments, the title of the page may be displayed as a first line below the designated region 250, which may contain suppressed display of one or more controls or user-interface elements. One or more users or members who contributed to development of the page, and one or more sections providing details or page content 202 may be displayed in the page content region. The page content 202 may include multimedia content, embedded content, linked content, and other electronic content associated with the page or document.

By way of a non-limiting example, the page content 202 may also include a table of content (ToC), a summary or outline of the page, and so on. In some embodiments, the ToC, and/or the summary or outline of the page may be manually or automatically generated. The ToC, and/or the summary or outline of the page may be generated using a user-provided script or instructions. For example, the ToC may be automatically generated based on a heading style, such as a font size, an indentation, and so on. In some cases, the summary or outline may be generated automatically based on parsing of the content of each section of a page and/or the page content 202.

In some embodiments, the toolbar panel 204 may include and display an array of selectable controls or various menu options associated with management of the page according to the page-edit user interface. The toolbar panel 204 may include a set of selectable controls or options that can be used for creating or modifying user-generated content into the editable region 201 or editor of the page-edit user interface 200. By way of a non-limiting example, the array of selectable controls or various menu options in the toolbar panel 204 may include a selectable control or a menu option for formatting the page (e.g., a font type, a font size, line spacing, indentation, inserting external content as a link or a reference), and so on.

In some embodiments, and by way of a non-limiting example, the user, who is shown by the user profile icon 208, may select a specific publication status of the page. For example, the user may select a publication control 206 shown in the page-edit user interface 200 to set or modify a publication state of the page. For example, the publication control 206 may be used to publish, unpublish, or otherwise control the availability of the content for viewing by other users. In the published state of the page, the page content may be available to a predefined set of users of a content collaboration platform according to access rights management settings for the page and/or a user profile associated with one or more other users. In some cases, the publication status may be limited to a defined set of users having accounts with the content collaboration system and may be referred to as an internal or limited publication. In other cases, the publication status may allow all users (the entire public) to view the content via an externally available address like a uniform resource locator (URL) or other hierarchical path.

In some embodiments, and by way of a non-limiting example, the page content, the status indicator corresponding to the page, the access rights management settings corresponding to the page, and so on, may be stored as a data field or metadata of a page object or document object in a database that is communicatively coupled with the content collaboration platform. The page or document object may include the user-generated content (e.g., content 202), page or document metadata, and/or elements of a transaction history or event log. In some cases, the page object or document object is stored as multiple data entries that may be stored in a distributed fashion but are able to be accessed using a common page or document identifier (e.g., page ID or document ID).

FIG. 2B depicts another example view of the page-edit user interface 200 of the frontend application. As discussed previously, the page-edit user interface 200 as shown in FIG. 2B includes a designated region 250 in which one or more content status options may be displayed as graphical user interface (GUI) elements. In some cases, the designated region 250 may be positioned above a first line of the page content. Accordingly, the designated region 250 may be substantially or completely free from the page content. In some cases, the designated region 250 may be positioned at other locations on the page. Other controls or GUI elements may also be displayed within the designated region including but not limited to, "add emoji," "add header image," "add page content contributors," and so on. Similarly, these controls may be revealed or unsuppressed in response to a particular user input (e.g., a cover command).

As mentioned previously, when a user hovers or cause a dwell of a page control pointer 203 (e.g., a cursor) at or within a specific area (e.g., the designated region 250) of the page-edit user interface 200. This action or input may be referred to internally as a hover command or hover input and may be used to reveal a content status option as part of a set of revealable controls which may include additional options or values may be displayed to the user. In some cases, the additional options or values may be displayed to the user as a radio button, a check box, or a free form of user input (e.g., the user may create her own value). In response to the user positioning the cursor away from the GUI element, the display of the additional options or values may be suppressed.

In the example of FIG. 2C, in response to a user selecting the GUI element associated with the "add page status" content status option 210, a window element 220 may be displayed which includes additional options and controls. The window element 220 may be a pop-up or floating window element that overlays or overlaps at least a portion of the page content 202 being displayed. In some embodiments, the interface provided by the window element 220 includes a list of selectable content status items 224, a text entry region 222, and other controls or selections. As shown in FIG. 2C, the list of selectable content status items 224 may include entries for "rough draft," "in progress," and "ready for review." In some embodiments, the number of selectable content status items 224 that are displayed may be predetermined or configurable. The selectable items 224 may be determined in accordance with an administrator profile or other system-level setting. These settings may be specific for a particular space, domain, or set of pages or documents. In some embodiments, the default values may be selected based on one or more factors, including but not limited to, current stage of the page development, history of previous page statuses of the page, history of previous page statuses set by the user, a set of default page status values corresponding to a space or a domain in which the page is created. In this case, the space or the domain may be associated with a particular project and/or a group of users. In some cases, and by way of a non-limiting example, each selectable content status item 224 may be displayed using a different font and/or a different color in accordance with a predefined color palette.

In some embodiments, the selectable content status items 224 may also include a list of user-created content status item. Creation of custom content status items is described below with respect to FIGS. 4A-4C. As shown in FIG. 2C, a custom content status item may be created in response to user text input provided to the text entry region 222. For example, the user may set the custom page status as "Draft for Delivery on May 18, 2022," or "Draft for John," or other user-defined status.

In accordance with the user selection of a particular selectable content status item, the page object or document object associated with the displayed page or document content 202 may be modified. In some cases, the content status may be stored in the metadata of the page or document. In some cases, the content status is also reflected in a document index or other registry to facilitate searching and retrieval of content associated with a common or designated content status.

In some embodiments, the user-created custom page statuses may be available to the user for other pages that the user is working on in the same and/or other domain or space. Accordingly, the user-created custom page statuses may be available to the user for selection using the list of user-defined content status items. In some cases, the number of user-created custom page statuses displayed for selection using the pull down list may be limited to predetermined or preconfigured number of custom page statuses, for example, 5 or fewer custom page statues.

Figure 3A:
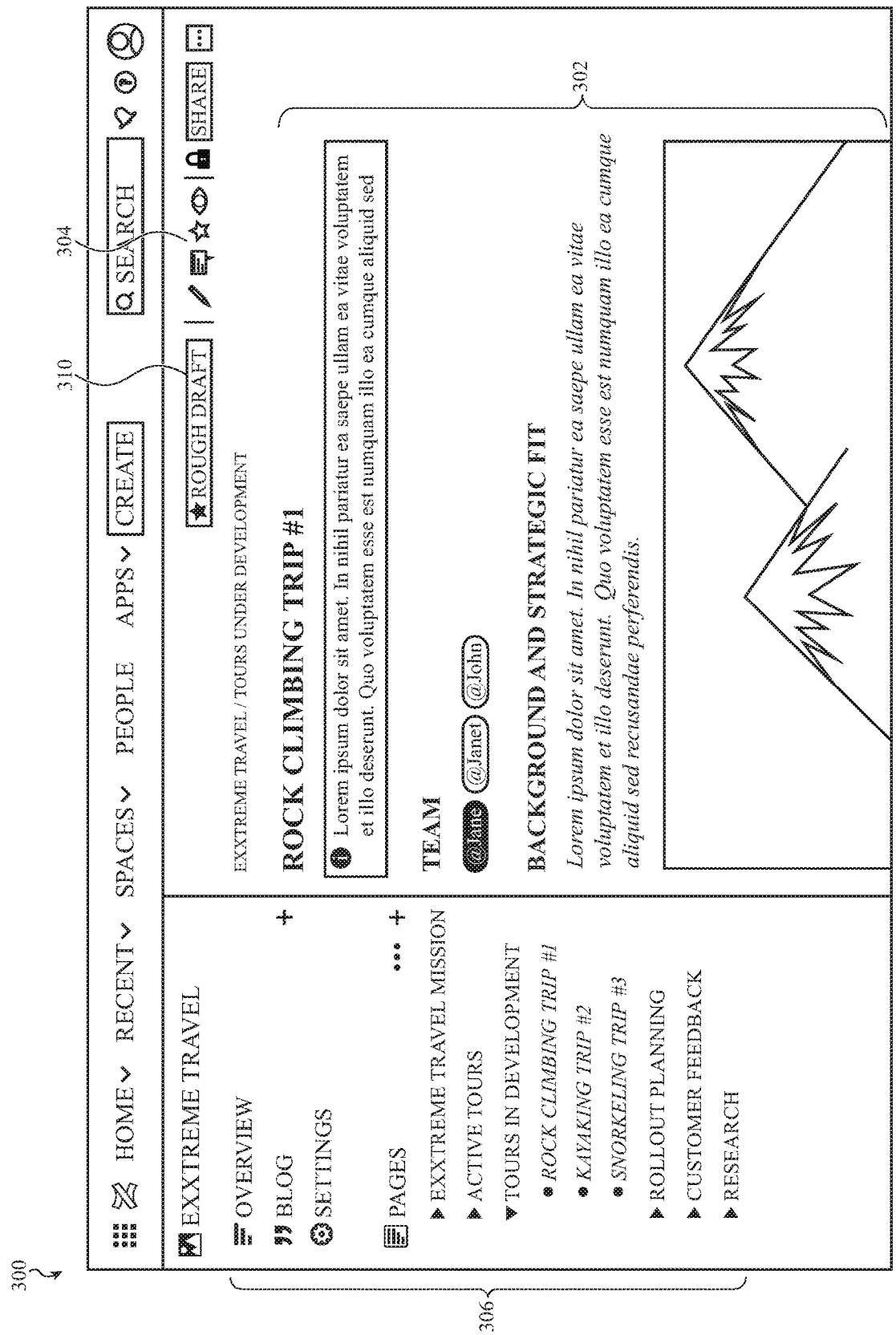
FIGS. 3A-3B depict example views of a page-view interface of a frontend application.
Figure 3B:
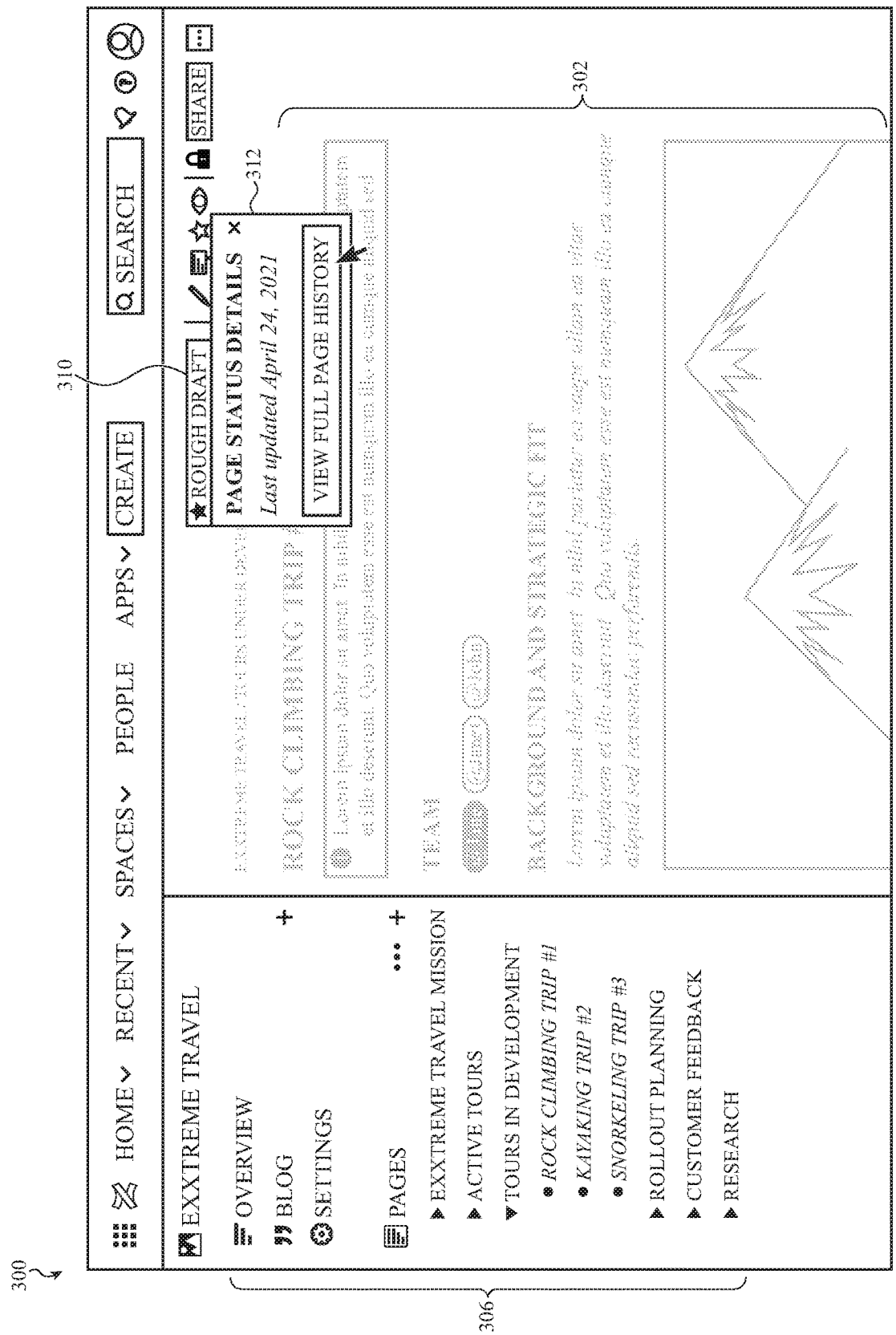

FIGS. 3A-3B depict example views of a page-view user interface 300 of a frontend application. The page-view user interface 300 allows authorized users to view content of a page. The page-view user interface 300 may allow for the viewing of content that has been published, either to a limited set of users, or to the public, who are able to access the content at a particular endpoint or URL. The page-view user interface 300 may also be referred to herein as a content-view user interface, document-view user interface, view user interface, or viewer. The page-view user interface 300 may be implemented in a web browser client application using HTML, JavaScript, or other web-enabled protocol. The page-view user interface 300 may allow a designated user to view, browse, search, or otherwise consume the page content 302. In many cases, the page-view user interface 300 allows for the creation of additional content, which may be in the form of embedded comments, user-generated tags, or other similar content. However, modification or edit of the underlying page content 302 may be restricted or prohibited from within the page-view user interface 300.

As shown in FIG. 3A, the page-view user interface 300 may include additional elements that facilitate navigation and consumption of electronic content. For example, the page-view user interface 300 includes a page tree 306, which may be displayed on the left panel of the page. The page tree 306 (also referred to as a hierarchical navigation panel, navigational document tree, or content tree) may include one or more tree elements or selectable items, each item selectable and configured to cause display of a respective page or document in the main panel in response to a user selection. In one example, in response to the user's selection of a tree entry 304, the page-view user interface 300 may automatically navigate the user to a page or document associated with the selected entry, which may be caused to be displayed in the main or page content region of the page-view user interface. In some embodiments, and by way of a non-limiting example, the page content region may be on the right and/or center panel of the page.

Further, the page-view user interface 300 may also include and display an array of selectable controls 304. The array of selectable controls 304 may include, but not limited to, a content status control 310. The content status control 310 may display a status indicia corresponding to the content of a section of the page that is displayed in the page content region. Accordingly, when the user accesses another tree entry, then the status indicia in the content status control 310 may be updated for displaying on the display. As shown in in FIGS. 3A-3B, the content status control 310 may include current page status along with a user selected color code and/or symbol for the particular page status value. The content status control 310 may be set by the author of the page or document but may otherwise be restricted for modification by other users. In some cases, an administrator or space admin may override or have the ability to change the permissions associated with a change in the content control status 310.

The content status control 310 serves as both a notification of the status of the page or document while also providing a control to view additional data or take additional actions with respect to the page or document. As discussed earlier, the content status control 310 allows an author or content creator to signal a state or status of the draft, independent of publication state. Accordingly, while content may be published and available for viewing by a designated group of users, the users are put on notice regarding whether the draft is likely to change over time or is in a final or near-final form. The content status may also indicate a user or user group that is responsible for reviewing or approving the content, which may facilitate user feedback or document approval actions.

In some cases, the content status may be advanced in accordance with a workflow or a programmable sequence that is able to automatically change in accordance with a time threshold, a user approval action, a task completion, or other system event. For example, content that is designated as a "rough draft" may automatically advance to "final draft" or "unmodified draft" after a designated amount of time has elapsed without additional edits or modifications and/or approval from a user is received. The programed workflow or state transition of the content status may also be driven by one or more system events or automation sequences. For example, the content status for a group or set of content items may be advanced in accordance with a bulk action command or automation script configured to modify page content or document content in a designated page space or other domain.

In some cases, the content status may be used to automatically trigger one or more messages or communications in accordance with a timing criteria or other predetermined rule or criteria. For example, content that is designated as having an early or rough draft content status and also not modified for an amount of time exceeding a predetermined threshold may cause the system to generate a notification or a message to the user including a prompt to either modify the status or edit the content. In some cases, the message may be transmitted to other users associated with the author including a page administrator, supervisor, or content manager for the system. In some cases, the transmitted messages include embedded links or selectable elements that may automatically advance or modify the content status in response to a user input directly in the body of the message.

As shown in FIG. 3B, in response to the content status control 310 being selected, additional data or information or options may be caused to be displayed. In this example, an overlay window may be displayed with additional information regarding the content and one or more options to view additional information or take additional actions. Specifically, the window 312 overlays or overlaps a portion of the content 302 and includes page status details, such as the last date and time corresponding to the page status update may be displayed. In some cases, a history of page status changes may also be displayed. In some cases, the user may provide a date range, a page status set or changed by a specific user, and/or a particular page status value as one or more filter options to view the history of page status changes. Additional details including data extracted from the page or document metadata may also be displayed in the window 312. In some cases, information from a transaction history or user event logs may be obtained and a summary of which may be displayed in the window 312.

In some implementations, the window 312 may also include one or more actions that can be performed with respect to the content or all content within a space or domain having a similar or the same content status. For example, the window 312 may include an option that can be used to invoke or specify a set of actions for all content items (documents or pages) having the designated status. Example actions include an action to change the content status, an action to retrieve all content having the designated content status, an action to archive all content having the designated content status, or any other system action that can be performed on a group of items in accordance with a script or automation sequence.

Figure 4A:
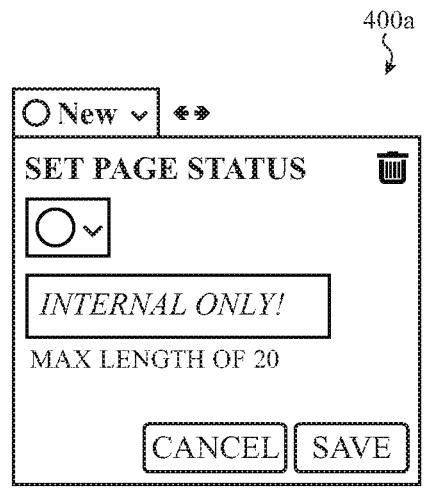
FIGS. 4A-4C depict example views of an interface of a window element.
Figure 4B:
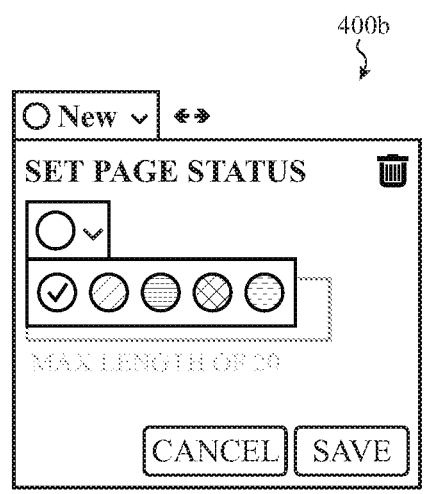
Figure 4C:
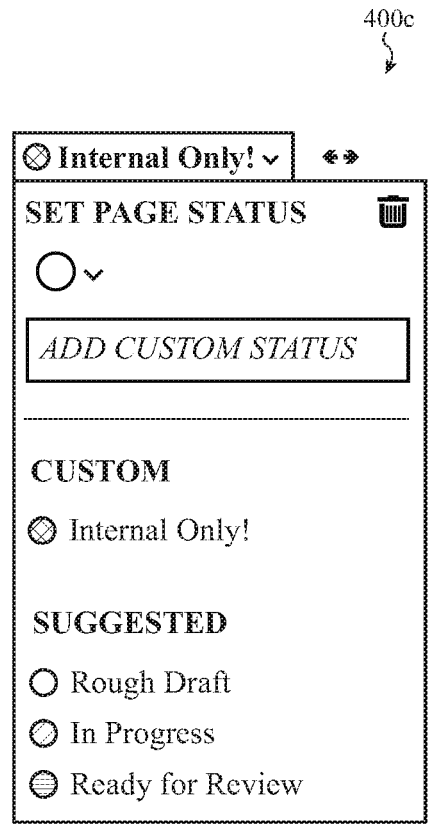

FIGS. 4A-4C depict example views of an interface of a window element. Specifically, FIGS. 4A-4C depict an example sequence of operations for generating a custom or user defined page status designator. For example, view 400*a*, shown in FIG. 4A, may correspond with a GUI element (or a window element) associated with the "add page status" content status option (e.g., item 210 of FIGS. 2B and 2C). When a user selects or hovers over page control pointer at or within the specific area of the GUI element associated with the "add page status" content status option, a pop-up or floating window element overlaying over the page displaying content of the page may be generated. As shown in the view 400*a*, the user may select a custom page status by providing user input into a text box. For example, the user may select the custom page status to be "Internal Only!" as the page should not be available to people outside an organization and/or a group. In some embodiments, and by way of a non-limiting example, the custom page status value may be limited to a particular word or character count length limit. For example, the custom page status may be limited to 20 characters or 5 words.

In some embodiments, the most recent or current custom page status value may be displayed on the top as a label of a pull down list including all or predetermined number of custom page status values used by a user for the same page being edited or created, and/or other pages created and/or edited by the user in the same or different space or domain.

In some embodiments, the user may select a particular custom page status value and may also delete it. In some cases, the custom page status values that are created by the user and not currently being applied to any page may be automatically deleted upon periodic or aperiodic evaluation of the user-created custom page status values and whether they are being applied to any page.

In some embodiments, as shown in a view 400*b* in FIG. 4B, the user may select a particular color to associate with a custom page status value. The color may be selected in accordance with a predefined color palette. By way of a non-limiting example, the user may also select a specific font type and/or a specific font size to associate with the custom page status value.

In some embodiments, as shown in a view 400*c* in FIG. 4C, the newly created status is added to the list of selectable items used to assign a content status to a page or other electronic content. The newly created content status may be stored or associated with a user profile or other user-related setting stored on the system. In some cases, a certain number of user-created custom page status values may be displayed under a label, such as "custom." The most recent or current custom page status value may be displayed on the top. However, in some cases, the user may also display the custom page status values in any other order, such as alphabetically ascending or alphabetically descending, and so on.

In some cases, the one or more custom page status values may be suggested to the user based on a user profile, a group profile, an administrator profile, a space and/or a domain in which the page may be created and/or edited, a current stage of the page development, and so on. For example, the one or more custom page status values suggested to the user may be "Rough Draft," "In progress," and/or "Ready for Review," and or other items.

Accordingly, in accordance with some embodiments, as shown in FIGS. 4A-4C, user-defined selectable content item, such as a custom page status value may be generated. Further, the user profile may be updated to display the user-created custom page status values for the user to select. In some cases, the user-created custom page status values may be available across domains and/or spaces. In some cases, the user-created custom page status values may be available only to the page and/or the domain/space in which the page is created.

Figure 5:
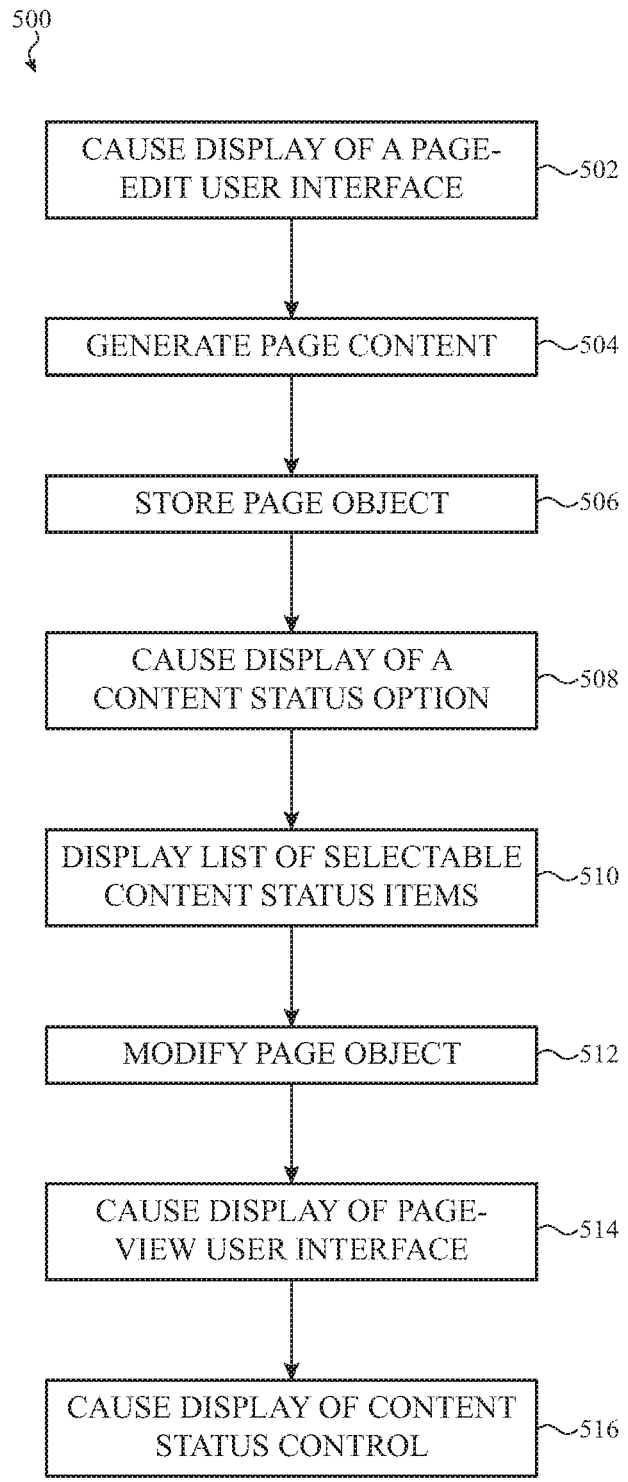
FIG. 5 depicts a flow chart corresponding to example operations of a process performed using a content collaboration platform or other similar system.

FIG. 5 depicts a flow chart corresponding to example operations of a process performed using a content collaboration platform or other similar system, in accordance with some embodiments. As shown in a flow chart 500 in FIG. 5, at 502, in response to receiving, at a host server, such as a first platform backend 106 or a second platform backend 107, and from a client device, such as the client device 110, 112, 114, or 116, a request to edit a page at the client device, the host server may cause display of a page-edit user interface on the client device. The page may be maintained by the content collaboration platform, as described herein, in accordance with some embodiments. The content collaboration platform, thus, may host electronic documents, such as web pages, files, audio and/or video content, and so on, and allow users of the content collaboration platform to create, edit, modify, and/or delete the electronic documents, for example, a page (or a web page), being managed by the content collaboration platform.

In some embodiments, an example view of the page-edit user interface displayed on the client device may be as shown in FIGS. 2A-2C. As shown in FIGS. 2A-2C, the page-edit user interface may be generated and displayed as a web browser application instance. The page-edit user interface thus may be generated according to hypertext transfer protocol (HTTP) or hypertext transfer protocol secure (HTTPS) protocol using hypertext markup language (HTML), JavaScript Object Notation (JSON), and/or a custom document format to transfer data between the client device and the host server of the content collaboration platform.

At 504, a user may generate and/or edit page content of the displayed webpage. For example, the user may add a new page content or edit page content using an array of selectable controls or various menu options associated with management of the page. The array of selectable controls or various menu options may be displayed in the toolbar panel 204. The user-generated or user-edited page content may be stored as a page object by the content collaboration platform, at 506. In some cases, the page object may be stored in a database as a database object having various fields or attributes corresponding to the page object. In one example, various fields or attributes corresponding to the page object may include, but not limited to, page content, a user who created the document, a user who last edited the document, history of changes of the page content, date and time corresponding to each change of the page content, and so on.

At 508, in response to the user hovering a cursor in a designated region, such as the designated region 250b, a content status option may be displayed on the generated page-edit user interface. The displayed content status option may be suppressed when the user moves the cursor away from the designated region. The content status option, as described herein, may provide information about status of the page to a user of the content collaboration platform. The status of the page may be set by a creator or editor of the page.

At 510, a list of selectable content status items may be displayed to the user. The list of selectable content status items may include default and/or suggested page status values. In some cases, the list of selectable content status items may also include one or more user-created or custom page status options. The user-created or custom page status options displayed in the list of selectable content status items may be limited to a predetermined number of page status options, for example, the last five page status options. In some cases, the user-created or custom page status options displayed in the list of selectable content status items may be user-created or custom page statuses that the user has created for any page and not just the page being created and/or edited by the user. In some cases, the user-created or custom page status options displayed in the list of selectable content status items may be page specific, and, therefore, include user-created or custom page status options created or set by any user of the content collaboration platform for the page. In some cases, the user-created or custom page status options displayed in the list of selectable content status items may be domain or space specific, as described herein, in accordance with some embodiments. In some cases, the user may create a new page status as described here in with reference to FIGS. 4A-4C.

At 512, in response to the user's selection of page status from the page status options displayed in the list of selectable content status items, the page object may be modified, and updated by the content collaboration platform. At 514, in response to receiving, at the content collaboration platform, and from a client device of any user of the content collaboration platform, a request to view the page being managed by content collaboration platform, a page-view user interface may be displayed on the client device. In some embodiments, an example view of the page-view user interface displayed on the client device may be as shown in FIGS. 3A-3B. As shown in FIGS. 3A-3B, the page-view user interface may be generated and displayed as a web browser application instance. The page-view user interface thus may be generated according to hypertext transfer protocol (HTTP) or hypertext transfer protocol secure (HTTPS) protocol using hypertext markup language (HTML), JavaScript Object Notation (JSON), and/or a custom document format to transfer data between the client device and the host server of the content collaboration platform.

At 516, the page-view user interface displayed on the client device may display page content and selectable control region in page content region of the page-view user interface. In some embodiments, and by way of a non-limiting example, the page content region may be on the right and/or center panel of the page. Further, as illustrated in the page-view user interface 300 displayed on the client device may also include and display an array of selectable controls 308. The array of selectable controls 308 may include, but not limited to, a content status control 310. The content status control 310 may display a status indicia corresponding to the content of a section of the page that is displayed in the page content region.

In some embodiments, as shown in the page-view user interface 300, the content status control 310 of the page-view user interface may include current page status along with a user selected color code for the particular page status value. By way of a non-limiting example, additionally or alternatively, additional page status details, such as the last date and time corresponding to the page status update may be displayed. In some cases, a history of page status changes may also be displayed. In some cases, the user may provide a date range, a page status set or changed by a specific user, and/or a particular page status value as one or more filter options to view the history of page status changes.

FIG. 6 shows a sample electrical block diagram of an electronic device 600 that may perform the operations described herein. The electronic device 600 may in some cases take the form of any of the electronic devices described with reference to FIGS. 1-4C, including client devices, and/or servers or other computing devices associated with the collaboration system 100. The electronic device 600 can include one or more of a processing unit 602, a memory 604 or storage device, input devices 606, a display 608, output devices 610, and a power source 612. In some cases, various implementations of the electronic device 600 may lack some or all of these components and/or include additional or alternative components.

The processing unit 602 can control some or all of the operations of the electronic device 600. The processing unit 602 can communicate, either directly or indirectly, with some or all of the components of the electronic device 600. For example, a system bus or other communication mechanism 614 can provide communication between the processing unit 602, the power source 612, the memory 604, the input device(s) 606, and the output device(s) 610.

The processing unit 602 can be implemented as any electronic device capable of processing, receiving, or transmitting data or instructions. For example, the processing unit 602 can be a microprocessor, a central processing unit (CPU), an application-specific integrated circuit (ASIC), a digital signal processor (DSP), or combinations of such devices. As described herein, the term "processing unit" is meant to encompass a single processor or processing unit, multiple processors, multiple processing units, or other suitably configured computing element or elements.

It should be noted that the components of the electronic device 600 can be controlled by multiple processing units. For example, select components of the electronic device 600 (e.g., an input device 606) may be controlled by a first processing unit and other components of the electronic device 600 (e.g., the display 608) may be controlled by a second processing unit, where the first and second processing units may or may not be in communication with each other.

The power source 612 can be implemented with any device capable of providing energy to the electronic device 600. For example, the power source 612 may be one or more batteries or rechargeable batteries. Additionally, or alternatively, the power source 612 can be a power connector or power cord that connects the electronic device 600 to another power source, such as a wall outlet.

The memory 604 can store electronic data that can be used by the electronic device 600. For example, the memory 604 can store electronic data or content such as, for example, audio and video files, documents and applications, device settings and user preferences, timing signals, control signals, and data structures or databases. The memory 604 can be configured as any type of memory. By way of example only, the memory 604 can be implemented as random access memory, read-only memory, Flash memory, removable memory, other types of storage elements, or combinations of such devices.

In various embodiments, the display 608 provides a graphical output, for example associated with an operating system, user interface, and/or applications of the electronic device 600 (e.g., a chat user interface, an issue-tracking user interface, an issue-discovery user interface, etc.). In one embodiment, the display 608 includes one or more sensors and is configured as a touch-sensitive (e.g., single-touch, multi-touch) and/or force-sensitive display to receive inputs from a user. For example, the display 608 may be integrated with a touch sensor (e.g., a capacitive touch sensor) and/or a force sensor to provide a touch- and/or force-sensitive display. The display 608 is operably coupled to the processing unit 602 of the electronic device 600.

The display 608 can be implemented with any suitable technology, including, but not limited to, liquid crystal display (LCD) technology, light emitting diode (LED) technology, organic light-emitting display (OLED) technology, organic electroluminescence (OEL) technology, or another type of display technology. In some cases, the display 608 is positioned beneath and viewable through a cover that forms at least a portion of an enclosure of the electronic device 600.

In various embodiments, the input devices 606 may include any suitable components for detecting inputs. Examples of input devices 606 include light sensors, temperature sensors, audio sensors (e.g., microphones), optical or visual sensors (e.g., cameras, visible light sensors, or invisible light sensors), proximity sensors, touch sensors, force sensors, mechanical devices (e.g., crowns, switches, buttons, or keys), vibration sensors, orientation sensors, motion sensors (e.g., accelerometers or velocity sensors), location sensors (e.g., global positioning system (GPS) devices), thermal sensors, communication devices (e.g., wired or wireless communication devices), resistive sensors, magnetic sensors, electroactive polymers (EAPs), strain gauges, electrodes, and so on, or some combination thereof. Each input device 606 may be configured to detect one or more particular types of input and provide a signal (e.g., an input signal) corresponding to the detected input. The signal may be provided, for example, to the processing unit 602.

As discussed above, in some cases, the input device(s) 606 include a touch sensor (e.g., a capacitive touch sensor) integrated with the display 608 to provide a touch-sensitive display. Similarly, in some cases, the input device(s) 606 include a force sensor (e.g., a capacitive force sensor) integrated with the display 608 to provide a force-sensitive display.

The output devices 610 may include any suitable components for providing outputs. Examples of output devices 610 include light emitters, audio output devices (e.g., speakers), visual output devices (e.g., lights or displays), tactile output devices (e.g., haptic output devices), communication devices (e.g., wired or wireless communication devices), and so on, or some combination thereof. Each output device 610 may be configured to receive one or more signals (e.g., an output signal provided by the processing unit 602) and provide an output corresponding to the signal.

In some cases, input devices 606 and output devices 610 are implemented together as a single device. For example, an input/output device or port can transmit electronic signals via a communications network, such as a wireless and/or wired network connection. Examples of wireless and wired network connections include, but are not limited to, cellular, Wi-Fi, Bluetooth, IR, and Ethernet connections.

The processing unit 602 may be operably coupled to the input devices 606 and the output devices 610. The processing unit 602 may be adapted to exchange signals with the input devices 606 and the output devices 610. For example, the processing unit 602 may receive an input signal from an input device 606 that corresponds to an input detected by the input device 606. The processing unit 602 may interpret the received input signal to determine whether to provide and/or change one or more outputs in response to the input signal. The processing unit 602 may then send an output signal to one or more of the output devices 610, to provide and/or change outputs as appropriate.

As used herein, the phrase "at least one of" preceding a series of items, with the term "and" or "or" to separate any of the items, modifies the list as a whole, rather than each member of the list. The phrase "at least one of" does not require selection of at least one of each item listed; rather, the phrase allows a meaning that includes at a minimum one of any of the items, and/or at a minimum one of any combination of the items, and/or at a minimum one of each of the items. By way of example, the phrases "at least one of A, B, and C" or "at least one of A, B, or C" each refer to only A, only B, or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

One may appreciate that although many embodiments are disclosed above, that the operations and steps presented with respect to methods and techniques described herein are meant as exemplary and accordingly are not exhaustive. One may further appreciate that alternate step order or fewer or additional operations may be required or desired for particular embodiments.

Although the disclosure above is described in terms of various exemplary embodiments and implementations, it should be understood that the various features, aspects, and functionality described in one or more of the individual embodiments are not limited in their applicability to the particular embodiment with which they are described, but instead can be applied, alone or in various combinations, to one or more of the some embodiments of the invention, whether or not such embodiments are described, and whether or not such features are presented as being a part of a described embodiment. Thus, the breadth and scope of the present invention should not be limited by any of the above-described exemplary embodiments but is instead defined by the claims herein presented.

Furthermore, the foregoing examples and description of instances of purpose-configured software, whether accessible via API as a request-response service, an event-driven service, or whether configured as a self-contained data processing service are understood as not exhaustive. In other words, a person of skill in the art may appreciate that the various functions and operations of a system such as described herein can be implemented in a number of suitable ways, developed leveraging any number of suitable libraries, frameworks, first or third-party APIs, local or remote databases (whether relational, NoSQL, or other architectures, or a combination thereof), programming languages, software design techniques (e.g., procedural, asynchronous, event-driven, and so on or any combination thereof), and so on. The various functions described herein can be implemented in the same manner (as one example, leveraging a common language and/or design), or in different ways. In many embodiments, functions of a system described herein are implemented as discrete microservices, which may be containerized or executed/instantiated leveraging a discrete virtual machine, that are only responsive to authenticated API requests from other microservices of the same system. Similarly, each microservice may be configured to provide data output and receive data input across an encrypted data channel. In some cases, each microservice may be configured to store its own data in a dedicated encrypted database; in others, microservices can store encrypted data in a common database; whether such data is stored in tables shared by multiple microservices or whether microservices may leverage independent and separate tables/schemas can vary from embodiment to embodiment. As a result of these described and other equivalent architectures, it may be appreciated that a system such as described herein can be implemented in a number of suitable ways. For simplicity of description, many embodiments that follow are described in reference to an implementation in which discrete functions of the system are implemented as discrete microservices. It is appreciated that this is merely one possible implementation.

In addition, it is understood that organizations and/or entities responsible for the access, aggregation, validation, analysis, disclosure, transfer, storage, or other use of private data such as described herein will preferably comply with published and industry-established privacy, data, and network security policies and practices. For example, it is understood that data and/or information obtained from remote or local data sources, only on informed consent of the subject of that data and/or information, should be accessed aggregated only for legitimate, agreed-upon, and reasonable uses.

What is claimed is:

1. A computer-implemented method for operating a computer-generated interface for editing and viewing electronic document content, the method comprising:
   at a backend configured to provide page content of a content collaboration platform over a computer network to a plurality of client devices, each client device operating a web browser client application:
      in response to a request to edit a page at a client device of the plurality of client devices:
         cause display of a page-edit user interface within the web browser client application, the page-edit user interface including page content generated in response to user input provided to the client device;
         cause the page content to be stored by the backend as a page object; and
         in response to a hover input over a designated region, cause display of a content status option within the page-edit user interface, the designated region substantially free of page content;
         in response to a user selection of the content status option, cause display of a list of selectable content item statuses in a window element that overlays at least a portion of the page content, the window element comprising a text entry region configured to receive user-entered text;
         in response to receiving user-entered text in the text entry region, generate a new user-defined selectable content item status;
         update a user-specific profile to include a new user-defined content status option that corresponds to the new user-defined selectable content item status; and
         in response to a user selection of a particular selectable content item status of the list of selectable content item statuses including the new user-defined content status option, modify the page object in accordance with the user selection of the particular selectable content item status;
      in response to a request to view the page at the client device of the plurality of client devices, cause display of a page-view user interface within the web browser client application, the page-view user interface including a page content region including the page content and a selectable control region including an array of selectable controls including a content status control displaying a status indicia corresponding to the particular selectable content item status.

2. The computer-implemented method of claim 1, wherein:
   the list of selectable content item statuses comprises:
      a first set of selectable content item statuses determined in accordance with an administrator profile; and
      a second set of selectable content item statuses determined in accordance with the user-specific profile.

3. The computer-implemented method of claim 1, wherein:
   the window element comprises a color designation input;
   in response to a user selection of the color designation input, provide a selectable color palette; and in response to a user selection of a particular color of the selectable color palette, assign the particular color to the new content status option.

4. The computer-implemented method of claim 3, wherein in accordance with a user selection of the new user-defined selectable content item status, the page-view user interface displays the content status control with an element having the particular color.

5. The computer-implemented method of claim 1, wherein:
the content status control is selectable when the page is displayed in the page-view user interface; and
in response to a user selection of the content status control, a content status window is displayed, the content status window at least partially overlapping the page content, the content status window comprising a time indicating a last content status change.

6. The computer-implemented method of claim 1, wherein:
the designated region of the page-edit user interface is positioned above a first line of the page content;
the hover input comprises positioning a cursor over the designated region; and
in response to positioning the cursor away from the designated region, display of the content status option is suppressed.

7. A system for operating a computer-generated interface for editing and viewing electronic document content, the system comprising:
memory storing a backend application configured to provide page content of a content collaboration platform over a computer network to a plurality of client devices, each client device operating a web browser client application; and
one or more processors operably coupled to the memory and when executing the backend application, cause the system to:
in response to a request to edit a page at a client device of the plurality of client devices:
cause display of a page-edit user interface within the web browser client application, the page-edit user interface including page content generated in response to user input provided to the client device;
cause the page content to be stored by the backend application as a page object; and
in response to a hover input over a designated region, cause display of a content status option within the page-edit user interface, the designated region substantially free of page content;
in response to a user selection of the content status option, cause display of a list of selectable content item statuses in a window element that overlays at least a portion of the page content, the window element comprising a text entry region configured to receive user-entered text;
in response to receiving user-entered text in the text entry region, generate a new user-defined selectable content item status;
update a user-specific profile to include a new user-defined content status option that corresponds to the new user-defined selectable content item status; and
in response to a user selection of a particular selectable content item status of the list of selectable content item statuses including the new user-defined content status option, modify the page object in accordance with the user selection of the particular selectable content item status;
in response to a request to view the page at the client device of the plurality of client devices, cause display of a page-view user interface within the web browser client application, the page-view user interface including a page content region including the page content and a selectable control region including an array of selectable controls including a content status control displaying a status indicia corresponding to the particular selectable content item status.

8. The system of claim 7, wherein:
the list of selectable content item statuses comprises:
a first set of selectable content item statuses determined in accordance with an administrator profile; and
a second set of selectable content item statuses determined in accordance with the user-specific profile.

9. The system of claim 7, wherein:
the window element comprises a color designation input;
in response to a user selection of the color designation input, provide a selectable color palette; and
in response to a user selection of a particular color of the selectable color palette, assign the particular color to the new content status option.

10. The system of claim 9, wherein in accordance with a user selection of the new user-defined selectable content item status, the page-view user interface displays the content status control with an element having the particular color.

11. The system of claim 7, wherein:
the content status control is selectable when the page is displayed in the page-view user interface; and
in response to a user selection of the content status control, a content status window is displayed, the content status window at least partially overlapping the page content, the content status window comprising a time indicating a last content status change.

12. The system of claim 7, wherein:
the designated region of the page-edit user interface is positioned above a first line of the page content;
the hover input comprises positioning a cursor over the designated region; and
in response to positioning the cursor away from the designated region; suppress display of the content status option.

13. A computer-implemented method comprising:
at a backend configured to provide electronic content over a computer network to a plurality of client devices, each client device operating a web browser client application:
in response to a request to edit a document at a client device of the plurality of client devices:
cause display of a document-edit user interface within the web browser client application, the document-edit user interface including electronic content generated in response to a first user input provided to the client device;
cause the electronic content to be stored by the backend as a document object; and
in response to a second user input at a designated region, cause display of a list of selectable content item statuses in a window element that overlays at least a portion of the electronic content, the window element comprising a text entry region configured to receive user-entered text;

in response to receiving user-entered text in the text entry region, generate a new user-defined selectable content item status; and update a user-specific profile to include a new user-defined content status option that corresponds to the new user-defined selectable content item status; and in response to a user selection of a particular selectable content item status of the list of selectable content item statuses including the new user-defined content status option, modify the document object in accordance with the user selection of the particular selectable content item status;

in response to a request to view the document at the client device of the plurality of client devices, cause display of a document-view user interface within the web browser client application, the document-view user interface including a content region including the electronic content and a selectable control region including an array of selectable controls including a content status control displaying a status indicia corresponding to the particular selectable content item status.

14. The computer-implemented method of claim 13, wherein:

the list of selectable content item statuses is displayed in response to a user selection of a content status option; and the content status option is displayed in response to a hover input over the designated region.

15. The computer-implemented method of claim 14, wherein:

the designated region of the document-edit user interface is positioned above a first line of the electronic content;

the hover input comprises positioning a cursor over the designated region; and in response to positioning the cursor away from the designated region, display of the content status option is suppressed.

16. The computer-implemented method of claim 13, wherein:

the list of selectable content statuses comprises:

a first set of selectable content item statuses determined in accordance with administrator profile; and a second set of selectable content item statuses determined in accordance with the user-specific profile.

17. The computer-implemented method of claim 13, wherein:

the content status control is selectable when the document is displayed in the document-view user interface; and in response to a user selection of the content status control, a content status window is displayed, the content status window at least partially overlapping the electronic content, the content status window displaying document metadata.

* * * * *